United States Patent [19]
Siegel

[11] B 3,991,303
[45] Nov. 9, 1976

[54] VOLTAGE PULSE MULTIPLYING CIRCUIT

[75] Inventor: Leon Sidney Siegel, Tulsa, Okla.

[73] Assignee: Combustion Engineering, Inc., Windsor, Conn.

[22] Filed: Aug. 16, 1974

[21] Appl. No.: 492,946

[44] Published under the second Trial Voluntary Protest Program on January 27, 1976 as document No. B 492,946.

[52] U.S. Cl. .................... 235/151.34; 235/92 FL
[51] Int. Cl.² .................................... G06F 7/38
[58] Field of Search ........ 235/151.34, 92 FL, 151.3; 73/229, 230, 194 E, 194 R

[56] References Cited
UNITED STATES PATENTS

| | | | |
|---|---|---|---|
| 2,968,181 | 1/1961 | Mittelmann | 235/92 FL |
| 3,043,508 | 7/1962 | Wright | 235/151.34 |
| 3,566,685 | 3/1971 | Zimmerman et al. | 235/151.34 X |
| 3,610,898 | 10/1971 | Yamamoto | 235/151.34 |
| 3,729,996 | 1/1973 | Metz | 235/92 FL X |
| 3,777,935 | 12/1973 | Storey | 235/151.34 X |
| 3,780,579 | 12/1973 | Barnard | 235/92 FL X |

Primary Examiner—Edward J. Wise
Attorney, Agent, or Firm—Arthur L. Wade

[57] ABSTRACT

A flow meter in the form of a turbine meter with a pick-up producing voltage signals related to fluid flow through the meter is connected to an electric circuit. The circuit includes a clock oscillator which is started and stopped to produce trains of voltage pulses upon demand by the flow meter signals. The predetermined number of train pulses are matched with the register of fluid quantity so a whole number of the train pulses will equal the smallest quantity unit of the register.

3 Claims, 1 Drawing Figure

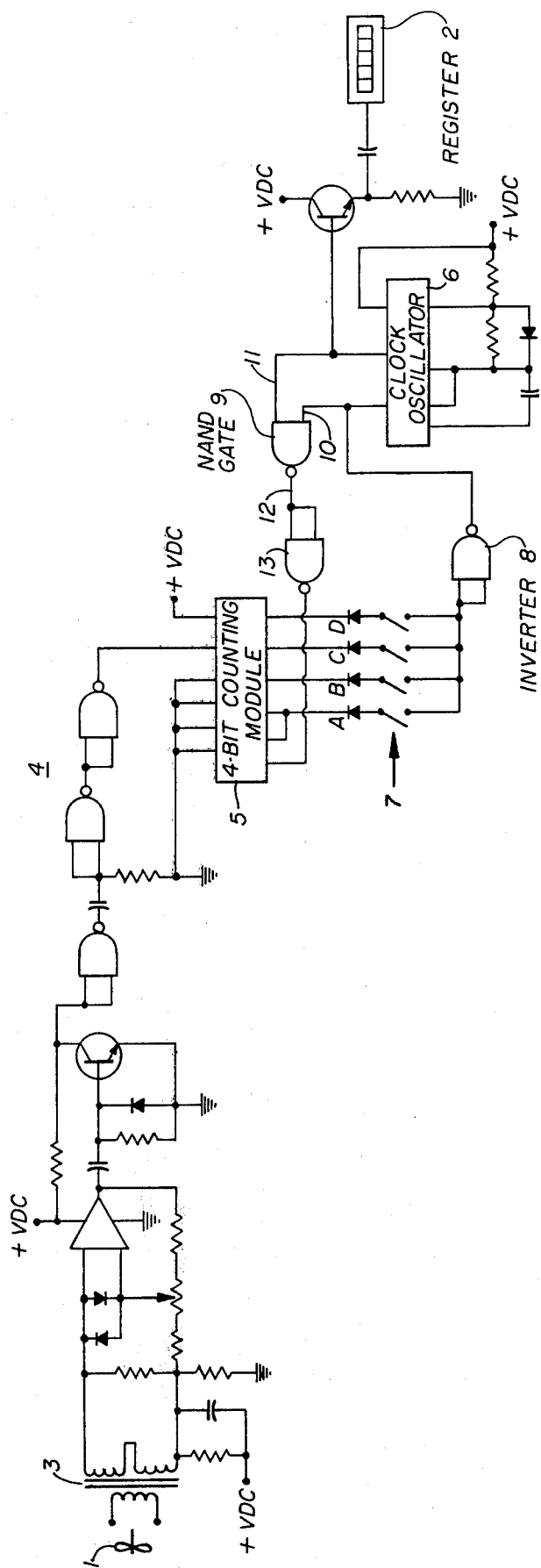

VOLTAGE PULSE MULTIPLYING CIRCUIT

BACKGROUND OF THE INVENTION

1. Field of the Invention

The present invention relates to resolving the signal frequency output of a flow meter. More particularly, the invention relates to structure for adding enough signals between consecutive flow meter signals to provide a whole number of signals to resolve the smallest unit of a register.

2. Description of the Prior Art

All fluid meters have outputs of a certain number of signals for each unit of fluid passing through the meter. If the meter is a turbine meter, each blade carried past the electrical pick-up generates an electrical pulse which will actuate a register.

The design engineer has a choice of meter sizes and the number of meter blades rotated by the fluid passed through the meter. Also he has available registers with readouts in certain units of fluid. With these choices, the engineer puts together a system in which he attempts to match flow pulses with register units to provide satisfactory accuracy in the readout. However, there may not be a match between the number of pulses per quantitative unit of fluid passed through the meter and the units of the register.

A simple example will establish the problem. A turbine meter of one inch diameter may be available with a 10-bladed rotor. This meter size and number of blades will produce 938 pulses per gallon of fluid through the meter. The register reads down to 1/10 of a gallon. Obviously 93.8 pulses are produced for 1/10 of a gallon. Since only whole numbers may be set in as a dividing factor, 94 is as close as the system can get to 93.8 pulses so the register of the system reads down to the 1/10 gallon with an approximate error of 0.2 percent.

If the meter pulses could be increased five times, this error could be eliminated. 469 pulses, a whole number, would then register as 1/10 gallon. Each 1/10 gallon unit on the register would equal each 469 pulses from the pick-up of the turbine meter, and no error could be possible from this portion of the metering system.

The basic problem of the art is simple, multiply the pulse output of the turbine meter until a whole number of pulses equals the smallest registered quantity of fluid metered. The problem of the art flowing from the basic one is that of multiplying the pulse output with accuracy and a minimum of structure. There are available clock oscillators whose train of output voltage pulses can be controlled by the output pulses of a turbine meter. It is known to control the output train of the clock oscillator through a gate controlled by each pulse output of the turbine meter. However, this circuit is somewhat complicated and it is difficult to keep from chopping off a part of the pulses of the train at the start and end of the segment gated.

Simplification is always desirable of any electrical circuit. Also, it is fairly evident that there is a probability that chopping out segments of a pulse train output of a clock will not consistently fix the number of pulses for each segment. The gate will be cutting in the train while a pulse is only partially formed and slicing off part of a pulse at the end of the segment. The inaccuracy introduced into the prior art system is difficult to pin down. Still, reason tells us that this is one danger of error which should be eliminated.

SUMMARY OF THE INVENTION

A principal object of the invention is control the operation of a clock oscillator so it will generate a selected number of voltage pulses initiated by each voltage pulse generated by a flow meter for registration.

Another object is to select the number of clock oscillator pulses generated to produce a whole number of registered pulses for the smallest displayed unit of the register.

Another object is to manually select the number of clock pulses to produce a train of a desired whole number of pulses.

The present invention contemplates including the electrical pick-up of a fluid flow meter in an electric network, which network includes a binary counter receiving the voltage pulses generated by the meter pick-up and having manually setable output switches. A clock oscillator is included in the network to respond to the binary counter output, through its switches, to establish a predetermined number of output pulses to a register for each voltage pulse received by the binary counter. The clock is stopped after it has generated the number of output pulses set by the output switches of the binary counter. The clock is started by each pulse generated by the meter pick-up received by the binary counter and establishing an output through its output switches.

Other objects, advantages and features of this invention will become apparent to one skilled in the art upon consideration of the written specification, appended claims, and attached drawings, wherein;

The drawing is a diagramatic representation of the blades of a turbine meter and the electrical circuit connected between the meter and a register embodying the present invention.

DESCRIPTION OF THE PREFERRED EMBODIMENT

In the drawing the circuit between a flow meter, in the form of a turbine meter, and a register is used to describe the invention. The flow meter (turbine meter) is represented by its blades 1. The register 2 is indicated as a box with a digital display by which total quantities of the fluid are manifested for visual observation.

The smallest unit of quantity displayed at register 2 is to be represented by a whole number of signals generated by blades 1. Accuracy of the system depends upon attaining this whole number relationship.

The signals generated by blades 1 of the turbine meter have their origin in the sinusoidal voltage which is formed at the so-called magnetic pick-up of the turbine meter whose flux is interrupted by the passage of blades 1 through its field. These voltage variations are placed on the input of transformer 3.

The sinewave signal is squared and shaped into voltage pulses of desired height and width. The circuit which functions to produce these pulses is well known and readily recognized by those skilled in the art from the drawing. This section of the circuit includes a portion termed a monostable multivibrator 4 connected to counting module 5 to deliver the generated pulses of desired height and width.

The circuit, to this point, is somewhat complex. It has been shown in detail so one skilled in the art can focus attention on the invention in the disclosure. Several well-known circuits and units are utilized in the system, yet, in combination and functional cooperation with them, the invention is embodied in the system. U.S. Pat. Nos. GARRETT 3,683,189 and KENDRICK 3,641,819 employ similar techniques of disclosing amplifying and shaping circuit sections in association with inventions.

The circuit and function of a counting module is well-known in the prior art. Module 5 is represented as a 4-bit counting module because that was the specific form used in reducing the invention to practice. However, it should be understood that the size of module 5 is not a limitation on the inventive concept.

As the 4-bit binary counter, module 5, receives each pulse from circuit 4, all of the outputs A, B, C, D are reset. In this embodiment "reset" means to bring all outputs to logic 0 level.

The switch setting (manually set) will then enable the module to count up to 15 output pulses in each pulse train segment from clock oscillator 6. When the number of pulses (up to 15) is generated by clock 6, a feedback circuit between clock 6 and module 5 causes the development of a logic 1 level in the switch output of the module. The logic 1 level output from the switches to clock 6 turns the clock off. The clock 6, started and stopped in this manner, produces its bursts of pulses with the precise number of pulses predetermined by the pattern of switch closure.

The pulse train segments, fed to register 2 by the flow meter signals are precise in size. They are sized by the manually controlled switch closure of module 5. The clock "stopping-starting" control system is simple and definite and dependable. It is much more dependable and simplistic than the gating circuits for continuously run clocks of the prior art.

Although the invention is well described by the foregoing, it is advisable to return to the module for a closer analysis of it in function and the cooperation with the clock and feedback circuit. A glance at the above text reminds the student that the analysis began with outputs A, B, C, D, reset to logic 0 level. Regardless of which switches 7 are manually closed, this logic 0 level is their output to clock 6. The system calls for a logic 1 level to start clock 6. Therefore, an inverter 8 receives the logic 0 level and establishes a logic 1 level to start clock 6.

The pulse train output of clock 6 is fed out to register 2 by a conventional circuit segment as disclosed. At the same time the train is fed back to module 5 through a NAND gate 9.

A NAND gate is, itself, a well-known gating device. It is rendered conductive or non-conductive by a voltage applied to its control electrode. In this drawing, the control electrode is indicated as 10. The input to the gate is at 11. The output is at 12. To not conduct, the NAND gate is usually described as inhibited by a voltage applied to its control electrode. To conduct, the reverse is true. All of this is quite elemental. The basic point for going through this exercise in the ABC's of NAND gate operation is to make it clear that the output pulse train of clock 6 is fed back to control module 5. The control is to monitor, with feedback precision, the number of pulses in each train of pulses generated by clock 6. Inverter 13 is in the feedback circuit but simply as an electronic building block to place the required signal level on module 5 so the module will accept the signal as a count which will change the outputs A, B, C, D to logic 1 level when the pulse train contains the switch-setting determined number of pulses. Inverter 8 takes this logic 1 level output from switches 7, inverts it to logic 0 level and stops clock 6. This cycle continues to repeat as each pulse from the flow meter resets the outputs A, B, C, D to logic 0 level, starts the clock 6 and module 5 receives the output of clock 6 as a feedback which is counted by the module. This feedback system which starts and stops clock 6 is a certain and sure way of obtaining accurate results. It is much easier to obtain these results than to fumble around with the gating of the output of a continuously running clock such as 6. And, to one skilled in the art, this system in which the invention is disclosed is inherently more accurate than the gating system.

CONCLUSION

To become more specific in defining the invention, it is analyzed as including the fluid meter, an electrical circuit section to shape the flow voltage pulses, a binary counter with setable output switches, a clock oscillator, an inverter between the binary switch and clock and a feedback circuit between the clock output and the binary counter in which a NAND gate is controlled by the input to the clock. From the foregoing description, the function of these units in a complete system can be followed in actuating a register. If the disclosure functions correctly, the system will appear simple. The shaping of the meter pulses to reset the binary counter is not difficult to follow from the prior art. The inherent function of a binary counter is well-known. Oscillator clocks are evident sources of trains of voltage pulses. The system becomes unique when it starts and stops the clock by a feedback circuit. This is in definite contrast to the systems which simply gate the pulse train of a continuously running clock.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. An electric network which multiplies voltage pulses; including,
    a meter responsive to a flowing quantity of material by generating voltage pulses at a frequency proportional to the flow rate of the material,
    a circuit section connected to the meter and responsive to the voltage pulses to establish a series of voltage pulses having a consistent height and width,
    a binary counter connected to the circuit section to receive the voltage pulses and having manually setable output switches,
    an inverter circuit connected to the output switches of the binary counter,
    a clock oscillator connected to the inverter to receive the signal from the inverter as an input,
    a register connected to the clock oscillator output,
    and a NAND gate connected to the clock output as a unit in a feedback circuit to the binary counter and connected to the inverter for control of the function of the NAND gate in the feedback circuit,
whereby the counter has its output reset to a logic 0 level by each voltage pulse received from the circuit section and the inverter establishes a logic 1 level when it receives the logic 0 level from the counter switches to turn the clock on to establish its output voltage pulses at a predetermined frequency to the register during the time the logic 1 level is received as an input and the NAND gate receives the logic 1 level and is thereby uninhibited to allow the feedback circuit to transmit the clock pulses to the counter until the number of pulses established by the output switch setting is reached which re-establishes the logic 0 level to turn the clock off and inhibit the NAND gate to block the feedback circuit.

2. The electric network of claim 1 in which the register has its smallest unit actuated by a whole number of clock pulses.

3. The electric network of claim 2 wherein the meter is a turbine meter producing a sinusoidal wave form of voltage output and the circuit section connected to the turbine meter is a monostable multivibrator which produces the voltage train of pulses with a consistant height and width.

* * * * *